United States Patent [19]

Beausoleil et al.

[11] 3,872,998

[45] Mar. 25, 1975

[54] TAPE CARTRIDGE STORAGE DEVICE WITH DYNAMIC ORDERING

[75] Inventors: William F. Beausoleil, Hopewell Junction; Edward C. Uberbacher, Poughkeepsie, both of N.Y.

[73] Assignee: International Business Machines Corporation, Armonk, N.Y.

[22] Filed: June 13, 1973

[21] Appl. No.: 369,647

[52] U.S. Cl. .......... 221/79
[51] Int. Cl. .......... B65g 1/06
[58] Field of Search .......... 221/79, 5, 13, 92

[56] References Cited

UNITED STATES PATENTS 3,158,287 11/1964 Wilmer .......... 221/13

*Primary Examiner*—Stanley H. Tollberg
*Attorney, Agent, or Firm*—William S. Robertson

[57] ABSTRACT

An improved tape storage rack and tape cartridge handler is provided for tape cartridges having a generally elongated cylindrical shape. The cartridge handler fetches the cartridge from any location in the rack but returns the cartridge to a position that is most readily accessible to the cartridge handler. Since the most recently fetched cartridges tend to be the most frequently used cartridges, this tape cartridge storage device tends to keep the most often used cartridges in the position for fastest access, and the average access time for the cartridge handler is reduced.

In one embodiment of the invention cartridges are located in tandom on a removable sleeve in cells of the rack. A cartridge removed from a sleeve is returned to the outer most cartridge position of the sleeve so that the distance that the sleeve must be removed from its cell is kept low. In a second embodiment of the invention, cartridges are stacked one on top the other in vertical columns of the rack. When a cartridge is removed from a rack, any higher positioned cartridge is dropped one position and the cartridge that has been removed is later returned to the upper most position of its column in the rack. Thus, a high portion of the cartridge fetching operations are made at the uppermost positions of the rack.

7 Claims, 8 Drawing Figures

TAPE CARTRIDGE STORAGE DEVICE WITH DYNAMIC ORDERING

BACKGROUND

In a data processing system a familiar device for data storage is a magnetic tape that is wound on a reel. In one common way of using tape in a data processing system, operating personnel are notified that a particular tape is to be used, and the tape is manually taken from a storage rack, placed on a tape read-write device, and thereafter operated on automatically. The operating personnel are notified when the operation is finished and the tape is manually returned to its storage rack. Various devices have been proposed for automatically handling tape reels, and tape cartridges have been proposed to permit handling by these devices. A tape cartridge that will be described in detail later has a generally elongated cylindrical shape in contrast to the flattened cylindrical shape of conventional tape reels and tape canisters. A general object of this invention is to provide a new and improved storage device for tape cartridges of this type. In automatic cartridge handling systems of the prior art, the cartridges have been stored in rows and columns of a rack, and a positioning mechanism has been moved under automatic control to the rack position to fetch a particular tape cartridge. Another object of this invention is to reduce the time required for this mechanical operation by dynamically relocating the tape cartridges within the rack so that the tape cartridges that are more often used are in the position for quickest access.

THE INVENTION

In one embodiment of this invention a rack has rows and columns of cells in which cartridges are held on a removable sleeve. To fetch a particular cartridge, its sleeve is pulled outwardly from a rack to a location where a cartridge picker removes the cartridge from the sleeve. The sleeve is then returned and the cartridge is carried to a tape read-write station. When the operation on the tape is finished, the tape cartridge is pushed into its cell where it displaces the other cartridges inwardly and takes the outer most position.

By having the cartridges located in tandom, this storage rack achieves a very compact design. (By contrast, a rack with only one cartridge per cell may be many times as long to store the same number of cartridges.) As cartridges that have been used are returned to the outer most position of the cells, the most recently used cartridges become located in the outer most position of the rack where they can be fetched more quickly. Since the most recently used cartridges tend to be the most often used cartridges, a high proportion of the fetch operations will be made to the rack positions that can be accessed most quickly and the average access time per cartridge is reduced. (Because a cartridge may be used frequently during one period of time and infrequently during another period of time, this advantage cannot be achieved by any pattern of fixed cartridge position assignments.)

This tape cartridge storage device has the further advantage that the cartridge returning operation is simplified and faster.

In a second embodiment of the invention, tape cartridges are located in columns of a rack. The cartridges are arranged to stack within a rack without other vertical support. When a particular cartridge is removed from its position in a column, any higher positioned cartridges drop one cartridge position so that a cartridge is always returned to the top of its column. Thus, the most recently used cartridges tend to be located near the top of the rack. The cartridge handling apparatus is arranged to take advantage of this dynamic ordering of the cartridges and to provide improved access time.

The following detailed description of these two tape cartridge storage devices will suggest other embodiments of the invention.

THE DRAWING

THE EMBODIMENTS OF FIGS. 1–6

Figures 1, 2:
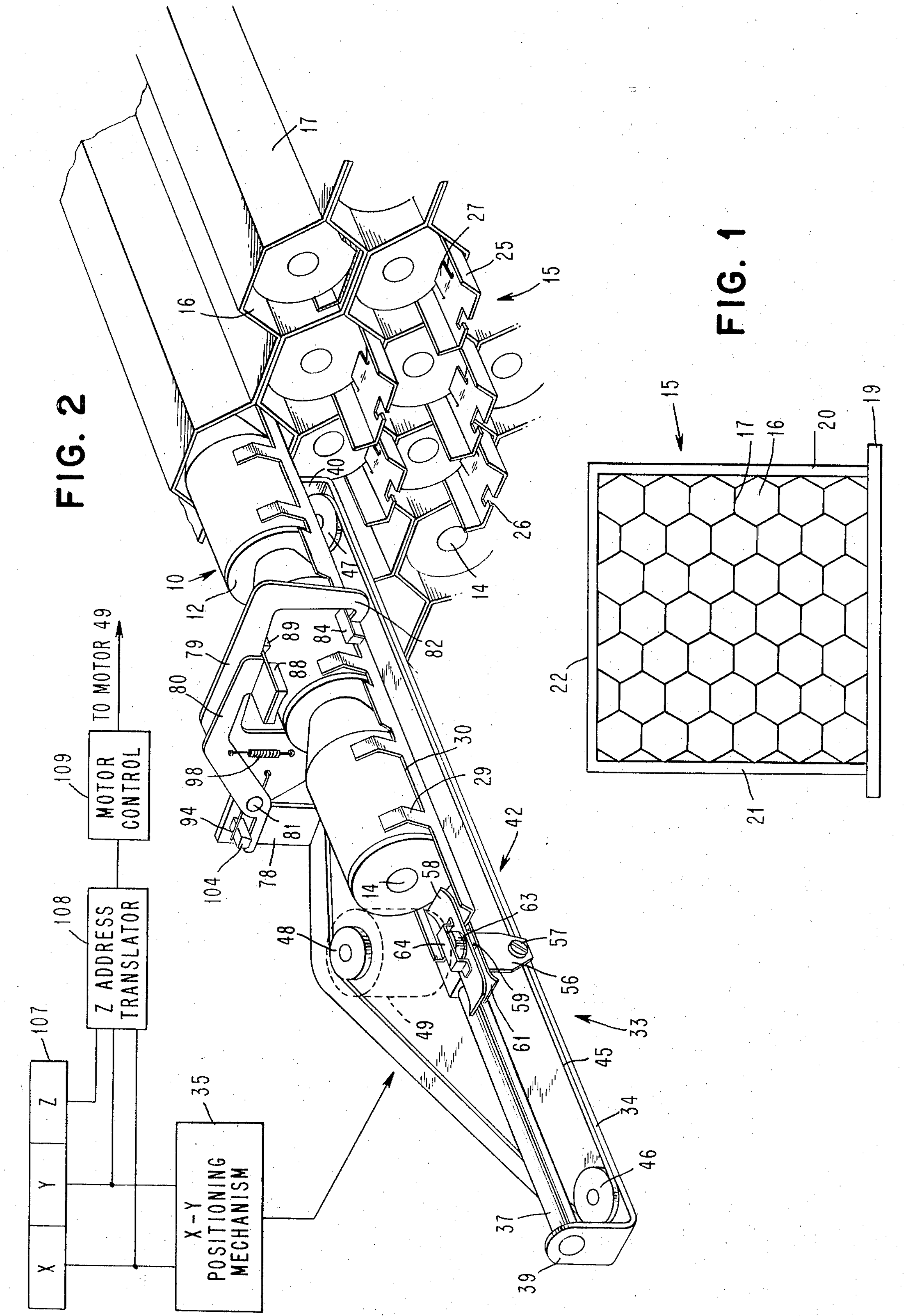
FIG. 1 is a simplified front view of the tape storage rack of one embodiment of the invention.
FIG. 2 is an isometric view of a portion of the rack of FIG. 1, the tape cartridges, and the cartridge handler.
Figures 7, 8:
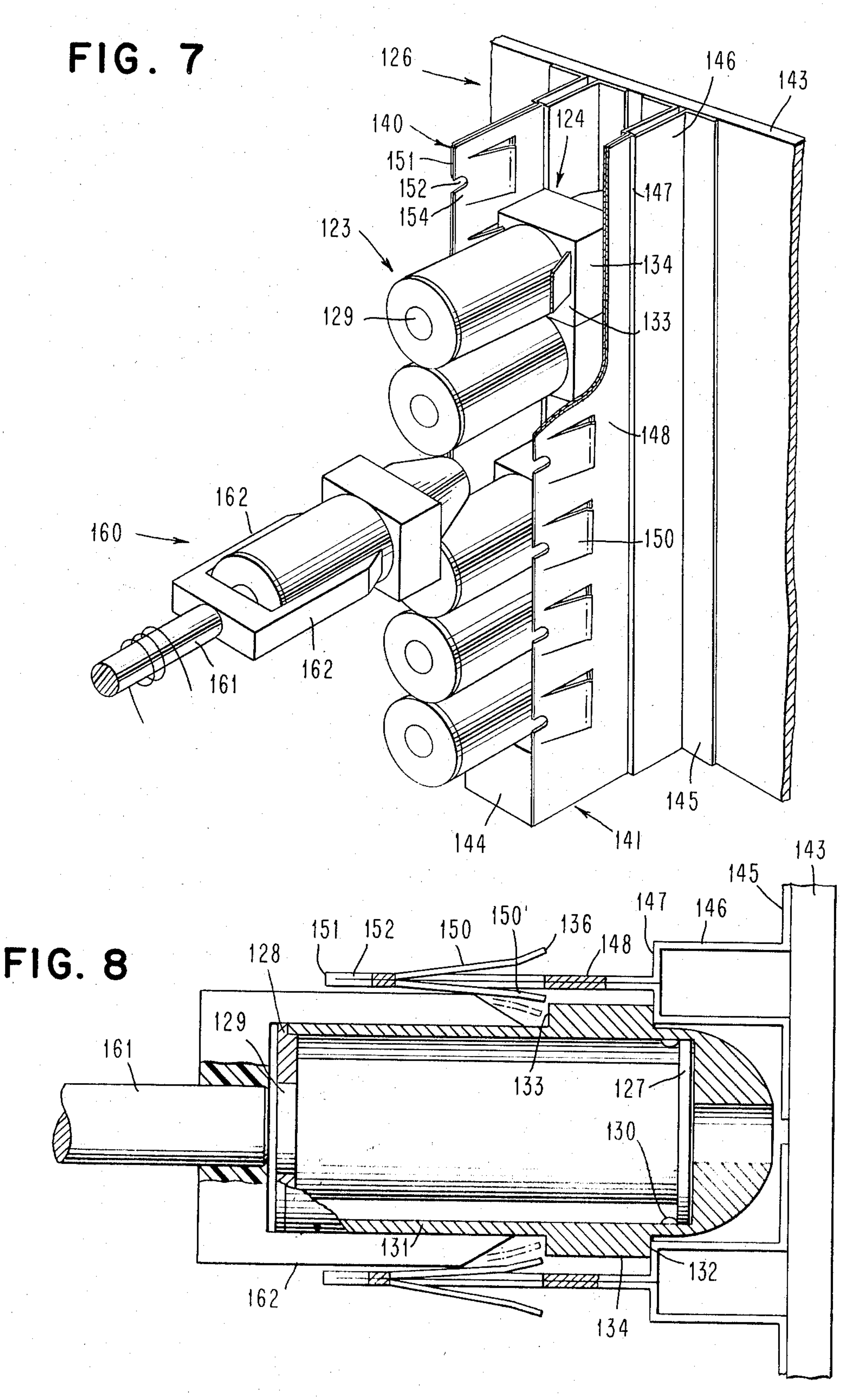
FIG. 7 is an isometric front view of the tape cartridge storage device of a second embodiment of this invention.
FIG. 8 is a top view partly in section of the storage rack and some of the related components of FIG. 7.

FIGS. 1 and 2 — As FIG. 1 shows, a tape cartridge 10 has a generally cylindrical shape and is longer in its axial direction than along a diameter. As can be seen in FIG. 2, the cartridge has a cylindrical wall 11 that joins a flat inwardly facing end that is hidden in the drawing and it has an outwardly facing end wall 12 that is removable by the tape read-write mechanism (not shown) for access to the tape reel. End wall 12 has a magnetizable insert 14 that permits the cartridge to be picked up by an electromagnet. FIG. 8, which will be described later, shows further details of a tape cartridge that is closely similar to the cartridge of FIGS. 1–6.

The cartridge storage rack 15 has hexogonal cells 16 formed by sheet metal or transparent plastic strips 17 that are folded and connected together as shown in the drawing. A base 19, side walls 20, 21 and a top 22 shown in FIG. 1 support the cell forming structure of strips 17. The rack is of a convenient height and width such as five feet by six feet and it is deep enough for each cell to hold a number of tape cartridges, preferably five.

Each cell 16 of rack 15 holds a removable sleeve 25 that carries several tape cartridge units in tandom. The outer end of each sleeve has an L-shaped opening 26 that is engaged by a sleeve removing mechanism shown in FIG. 2 and described later, and it has a spring 27 that forms a stop for holding the tape cartridge axially on the sleeve. A suitable stop (not shown) is also located at the inner end of the sleeve. At each tape cartridge position on a sleeve, springs 29 are positioned to hold the cartridge in its position on the sleeve. The sides of the sleeve are cut away in a region 30 to provide space for the walls of the tape cartridge to be gripped by a cartridge picker that will be described later.

The cartridge handler 33 includes a base 34 that is movable along rows and columns of the rack mechanism by a conventional X-Y positioning mechanism 35. A slide 37 is mounted between supports 39, 40 to extend parallel to the direction of withdrawing and returning a sleeve. A sleeve latching shuttle 42 is mounted to ride on slide 37. Shuttle 42 is attached to a belt 45 that rides on idler pulleys 46, 47 and a pulley 48 that is driven by a motor 49 that is mounted below base 34. Motor 49 is operated to position shuttle 42 at a selected point between the supports 39, 40.

Figure 3:
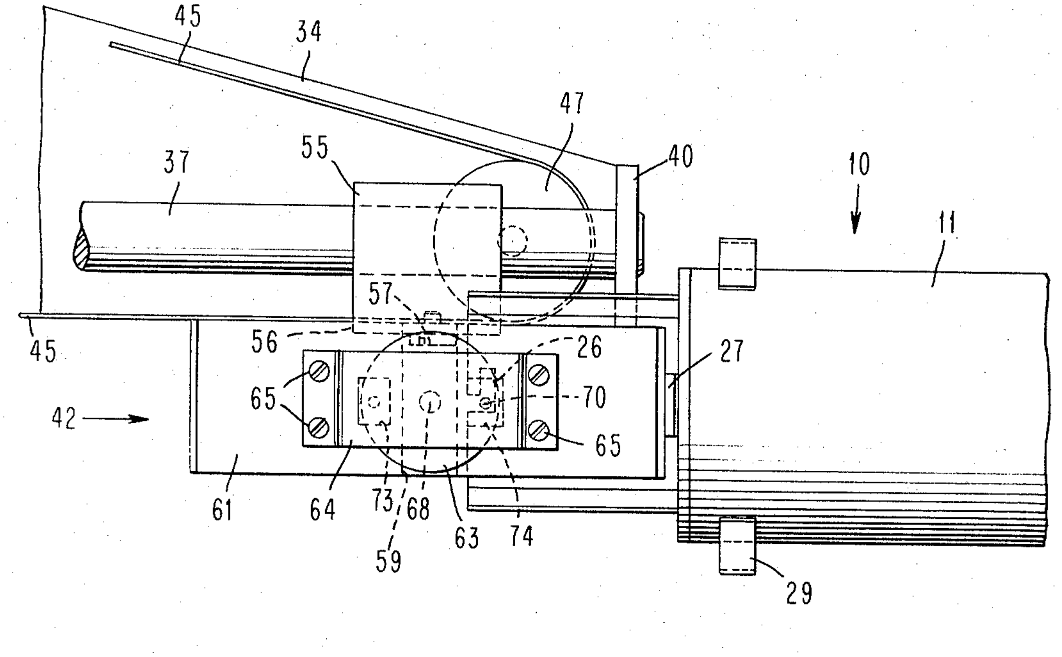
FIG. 3 is a top view of a shuttle mechanism of the tape cartridge handler device of FIG. 2.
Figure 4:
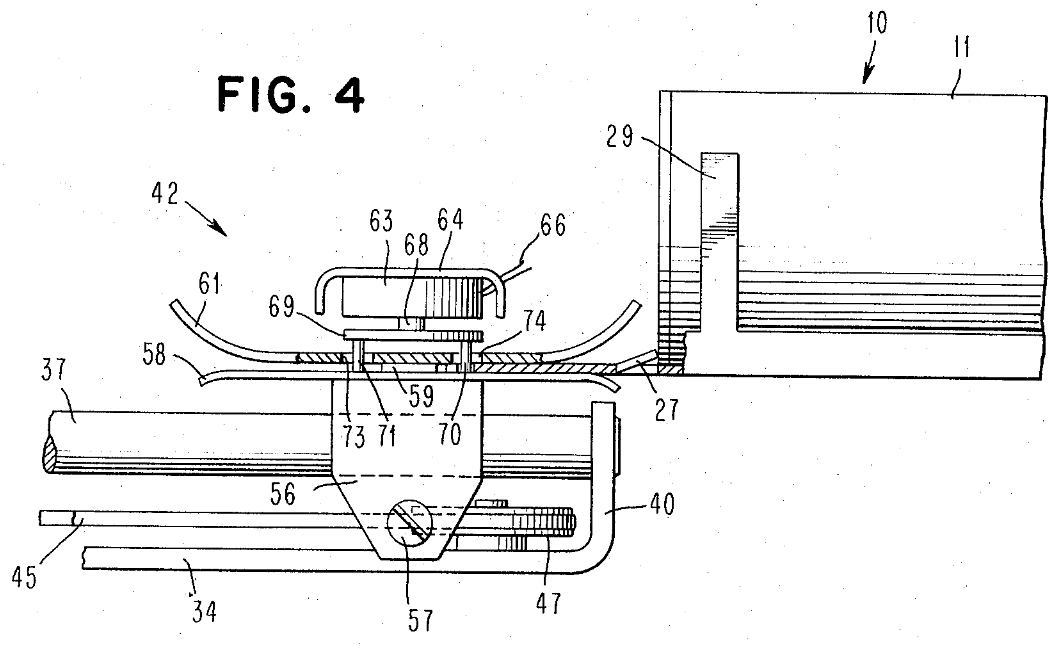
FIG. 4 is a side view of the shuttle mechanism of FIG. 3.

FIGS. 3 and 4 — Shuttle mechanism 42 includes a member 55 that rides on slide 37 and a member 56 that extends from member 55 to be connected by means of a bolt 57 to belt 45. Preferably, as the drawing shows, the shuttle mechanism 42 is symetrically constructed for latching an addressed sleeve to the right as shown in the drawing and for similarly latching sleeves of a rack located to the left in FIG. 1 (but not shown). A member 58 is mounted on member 55 and positioned to support the outer end of a sleeve as the sleeve is pulled outwardly from its rack. A spacer 59 mounted on member 58 supports a member 61 that guides the outward edge of a sleeve into a latching position and also pushes against a cartridge end wall 12 for returning a cartridge to its rack or for placing the cartridge into the cartridge reader. A rotary solenoid 63 is mounted on shuttle 42 by means of a bracket 64 that is attached by screws 65 to member 61. Solenoid 63 is energized through wires 66 to rotate a shaft 68. Shaft 68 rotates to turn a crank 69 carrying a pin 70 between a clockwise position to enter opening 26 in the edge of a sleeve and to a counter clockwise position to latch to the sleeve. A similar pin 71 is provided for latching sleeves of a rack located to the left in FIG. 2 and facing rack 15. Pins 70, 71 extend through openings 73, 74 in member 61.

Figures 5, 6:
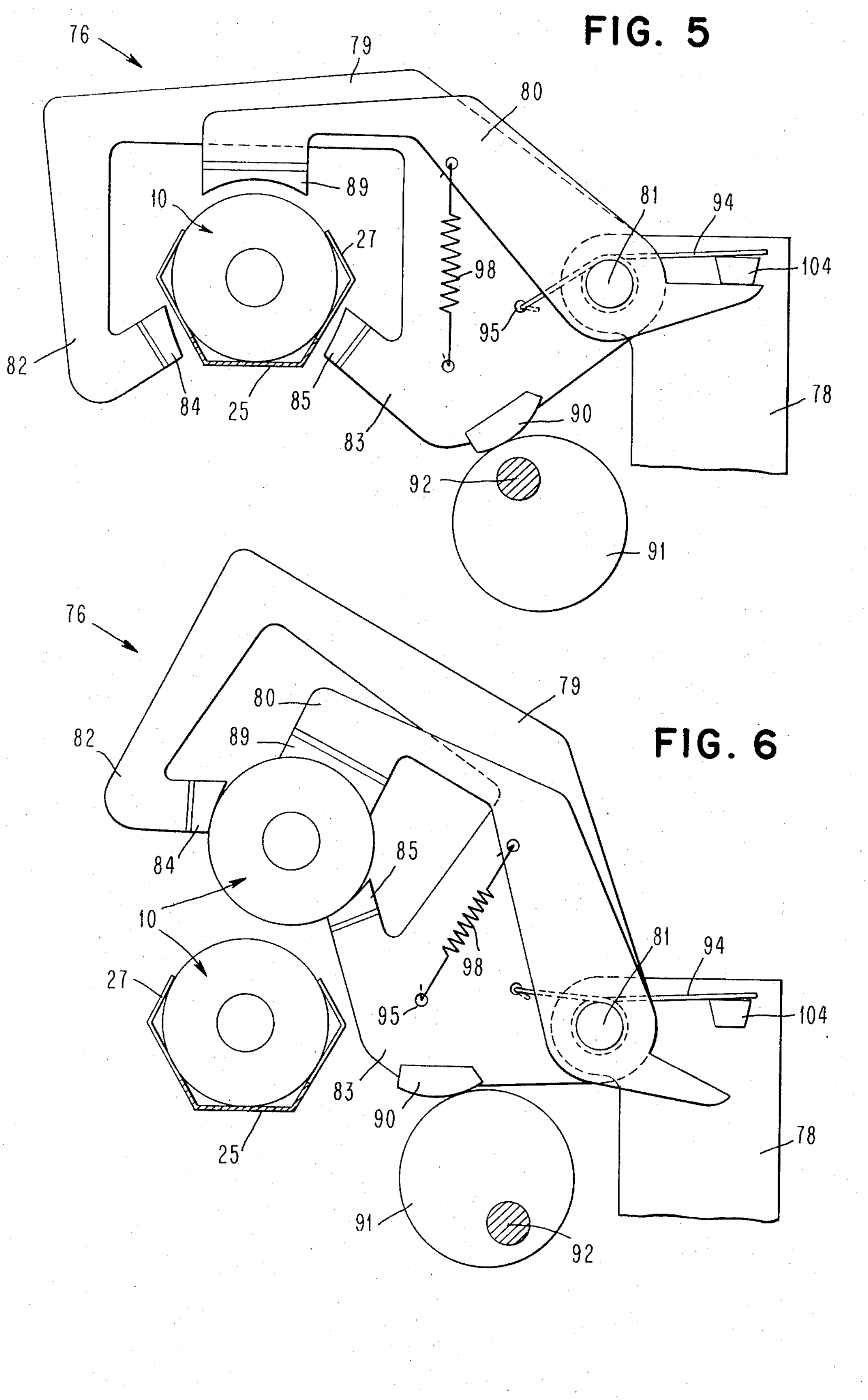
FIG. 5 is an end view of a tape cartridge and a cartridge picker of the tape cartridge handler of FIG. 2 at one point in the cartridge picking operation.
FIG. 6 shows the cartridge picker of FIG. 5 at a subsequent point in the operation.

FIGS. 5 and 6 — As FIG. 2 shows, a cartridge picker 76 is mounted on base 34 in a position to pick up the cartridge 10 that is in the selected sleeve position. The picker can be understood most easily by considering the components in the operating sequence represented by FIGS. 5 and 6 and by referring to FIG. 1 for the general relationship of these components to other parts of the storage device. The picker includes a post 78 that extends from base 34 and includes elements 79, 80 that pivot on a shaft 81 that is mounted on post 78. Element 79 is shaped to have two arms 82,83 that carry pads 84,85 that lift a cartridge 10 when element 79 is pivoted from the position of FIG. 5 to the position of FIG. 6. (Counter clockwise in the view of FIG. 2 and clockwise in the views of FIGS. 5 and 6.) Element 80 is shaped to carry a pair of pads 88,89 that engage the uppermost part of the sidewall of the selected cartridge when the picker is operated to hold a cartridge. Elements 79,80 are shaped to permit shuttle mechanism 42 to latch a sleeve and withdraw it from its cell when these elements are in the position of FIGS. 2 and 5 and to permit the shuttle mechanism to return a sleeve when the picker is in the position of FIG. 6.

Element 79 has a cam follower 90 that rides on a cam 91 that is driven from a shaft 92 of an electric motor that is not shown in the drawing. As shaft 92 is turned, it moves element 79 between its lowermost position shown in FIG. 5 and its upper position shown in FIG. 6. A spring 94 located on shaft 81 urges element 79 against cam 91. A spring 98 connected between elements 79,80 urges element 80 to a position to clamp a cartridge between pads 84,85,88,89. A stop 104 mounted on post 78 limits the pivoting of element 80 to hold pads 88,89 away from a cartridge when the picker is in the position of FIGS. 2 and 5.

OPERATION AND CONTROL — FIG. 2

The data processing system using the tape cartridge storage device of this invention identifies a particular type cartridge by an address having X, Y and Z dimension significance, as represented by register 107 in FIG. 1. The X dimension component of the address can be thought of as a cell row number as the rack is seen in FIG. 1 and the Y component can be thought of as the column number. Thus, these address components are applied to X-Y positioning mechanism 35 to position shuttle mechanism 42 in front of the addressed cell. In the routine operation of this storage device, a cartridge is returned to the cell from which it is taken and the X,Y components of the address remain unchanged. The Z component of the address changes as a cartridge not originally in the outermost position of a cell is returned to the outermost position. On the other hand, for many operations in the data processing system, it may be desirable to identify each cartridge by a virtual address that remains constant as the Z component of the actual address changes. A suitable address translator 108 is provided for this address translating function, either as part of the storage device or as part of the associated data processing system. Preferably, translator 108 has a shift register memory that stores the virtual address (the cartridge name) at a location that corresponds to the real address (the sleeve position). Counting the shifts in the shift register memory to the virtual Z address of register 107 gives the actual sleeve position address. (Or, the actual address can be stored with the virtual address.) The shift register is then shifted to represent the corresponding shift that takes place in the cartridge positions as the selected cartridge is returned to the outermost position in its sleeve. Various equivalent address translating systems and equivalent operations in a data processing system will be apparent. The actual Z dimension address is applied to a conventional motor control 109 for the drive motor 49 for shuttle 42 for removing a sleeve 37 only far enough to position the selected cartridge under cartridge picker 76. The X and Y components of the address are applied to X-Y positioning mechanism 35.

THE EMBODIMENT OF FIGS. 7 AND 8

The Tape Reel and Canister Unit

As FIGS. 7 and 8 show, a tape cartridge 123 is generally similar to the tape cartridge 10 of FIGS. 1–6 except that a cartridge 123 has a box like structure 124 located near its inward end. Structure 124 is used for stacking the units in rack 126 and for retaining the units within the rack and it will be called a "stacking and retaining structure".

The sectional view of FIG. 8 shows further details of cartridge 123 (and some details of cartridge 10). A tape reel has an inner flange 127 and an outer flange 128 that are connected by means of a shaft that is hidden in FIG. 8. A magnetic tape 129 is wound on the reel. Inner flange 127 is arranged to engage dimples 130 that are formed on the inside of the wall 131 of the cartridge for releasably retaining the reels in the cartridge. The outer flange 128 is arranged to close the outer end of the cartridge. It has a magnetizable insert 129 that permits either the reel or the reel and the cartridge to be picked up by an electromagnet.

FIGS. 7 and 8 also show surfaces 130, 131, 132, 133 and 134 of the stacking and retaining structure 124 which will be described later.

The Storage Rack

As FIG. 7 shows, the tape cartridges 123 are stacked in vertical columns and are held between rails 140, 141. The two rails that are shown in the drawing are identical and are representative of a large number of rails that are positioned to provide a selected number of storage columns. Rails 140, 141 are supported by a panel 143 and a base 144.

A rail is preferably made in the symetrically folded sheet metal construction shown in FIGS. 7 and 8 so that each rail cooperates with two adjacent rails to form stacking columns on either side. A flange 145 provides means for mounting a rail on panel 143. A portion 146 extends outwardly from flange 145 to a portion 147 that forms a stop against surface 132 of the cartridge stacking structure. A portion 148 extends outward from portion 147 for a suitable distance past surface 132 of cartridge 123 for carrying inwardly extending spring members 150. Spring members 150 are preferably formed as part of portion 148 and the folded edge 151 of a rail has notches 152 that form spring regions 153, 154 for each spring member 150. A spring member 150 has its inwardly facing edge 156 shaped to engage surface 133 of the stacking structure so that a cartridge can be mounted in a rack with surfaces 132 and 133 positioned between spring edges 156 and portions 147 of a pair of rails. The spring elements identified by the referenced character 150 are shown in their normal position when a cartridge 20 is in its storage position or when the storage position is empty. The spring elements identified by reference character 150′ are in a position to permit removing the cartridge as will be described later.

From a more general standpoint, the vertical support for the cartridge is provided only by the cartridge stacking and retaining structure 124 or by the storage rack base element 144. The edges 151 of spring member 150 are aligned vertically and cooperate with frame portion 147 to form a vertical channel for guiding the upper cartridges into a vacant position when a lower cartridge is removed.

The Cartridge Removing Mechanism

A cartridge removing mechanism 160 is arranged to move the spring member 150 into the position of retracted members 150′ shown in FIG. 8, and to hold the cartridge by magnetic attraction to the magnetizable insert 129. Mechanism 160 includes an arm 161 that is attached to a conventional X, Y, and Z positioner (not shown), a pair of wedges 162 to fit into the space between cartridge walls 131 and rail portion 148 to deflect elements 150 to a position to release the cartridge, and an electromagnet 163 energized through wires 164, 165. To pick up the cartridge, mechanism 160 is moved in the X-Y plane to the position of an addressed cartridge and then advanced into the position of FIG. 8. The elements 150 are moved to the position shown at 150′ and the electromagnet 163 is energized to hold the cartridge by the attraction to magnetic insert 128. Mechanism 160 is then retracted with edges 156 of spring elements 150 riding on surfaces 134 of cartridge stacking and retaining structure 19. As the addressed cartridge is retracted to the position of FIG. 7, any higher cartridges fall into the space made vacant.

Cartridges are always returned to the vacant upper most position of a column. The cartridge held by the electromagnet is inserted into the position shown in FIG. 8 and the electromagnet is de-energized. As the handling apparatus is moved in the cartridge retracting direction, the retaining element 150 moves from its position 150′ to its position shown at 150 and thereby retains the cartridge in its vertical channel.

Data processing operations similar to the operation of the apparatus of FIG. 1 maintain a directory of the Y (or vertical) dimension address of a cartridge; the X (horizontal) dimension address remains constant in the normal operation of the storage rack of FIGS. 7 and 8.

SUMMARY

The tape cartridge storage device of FIGS. 1–6 provides the space saving advantages of stacking the cartridges in a three dimensional array and it overcomes to a large extent the problem that cartridges located to the rear of the rack require a longer time to fetch them than those located in the outer positions. The embodiment of FIGS. 7 and 8 makes the uppermost cartridges most readily accessible: this feature gives an advantage where the virtual path is longer than the horizontal path of where for other reasons the time for virtual travel of the cartridge fetching mechanism lengthens the access time. It also illustrates variations such as a partial rotation of the structure so that the cartridges would slide along rows in the rack when a lower positioned cartridge is removed. Both embodiments of the invention are readily adaptable to being arranged along an arc where the drawing shows the cells extending along an X dimension. Both embodiments are useful with a wide variety of tape cartridges and the handlers for such tape cartridges. Those skilled in the art will recognize other applications and variations within the spirit of the invention and the scope of the claims.

What is claimed is:

1. A data cartridge storage device comprising,
   a rack having means providing positions to contain a plurality of cartridges in an array of at least two dimensions, the cartridge positions in one of said dimensions having progressively differing access times,
   means to remove a selected cartridge from the rack and return the cartridge to the rack,
   means for guiding said cartridges along said one dimension in the direction of longer access time when a cartridge is removed from a position of longer access time to provide the position of shortest access time for the cartridge being returned,
   whereby a dynamic ordering of cartridges occurs to reduce the average access time.
2. A data cartridge storage device comprising,
   a plurality of sleeves each providing a sequence of positions for holding a plurality said data cartridges in a line and each having means for guiding a cartridge from one position to the next position in the sequence,
   a rack having a two dimensional array of cells for holding said sleeves and said cartridges and having means for sliding said sleeves into said cells and outward from said cells, and cartridge handling means comprising, means for removing the sleeve of a selected cartridge from its cell sufficiently to pick up said cartridge and means to pick up said cartridge, whereby the access time for an outer cartridge position is faster than the access time for an inner cartridge position, and means for returing said cartridge to the outermost position of its sleeve and moving any cartridge previously in said outermost position and any contiguous cartridges inwardly along said sleeve one position, whereby a dynamic ordering of said cartridges occurs to reduce the average access time.

3. The device of claim 2 wherein said means for removing a sleeve comprises a shuttle, means supporting the shuttle for movement in the direction of removing a sleeve, means for latching the shuttle to a sleeve, and means for positioning said shuttle supporting means for removing a selected sleeve.

4. The device of claim 3 wherein said means for picking the selected cartridge from a sleeve comprises means for mounting said picking means on said shuttle supporting means near the rack position of fastest access time.

5. A data cartridge storage device, comprising, a plurality of rails and means supporting said rails to hold a column of said data cartridges in positions between pairs of adjacent rails, said supporting means supporting said rails with a sufficient vertical component for said cartridges to move downward one position through the force of gravity when a cartridge in a lower position in a column is removed, and cartridge handling apparatus comprising, means for removing a selected cartridge from its position in a column, and means for returning the selected cartridge to the uppermost position in its column, said cartridge handling apparatus having a shorter access time to the uppermost position of a column, whereby a dynamic ordering of said cartridges takes place to reduce the average access time.

6. The device of claim 5 wherein said rails extend vertically and said cartridges include a box like structure having sides for guiding a cartridge between two rails and having top and bottom surfaces for stacking cartridges in a column between the rails.

7. The device of claim 6 wherein said box like structure has outward facing surfaces near the rails and said rails include spring members individual to each cartridge position extending inwardly toward the outward facing surfaces of a cartridge and said means for removing a cartridge includes means for deflecting the spring members for removing a cartridge.

* * * * *